(12) United States Patent
Güttler

(10) Patent No.: US 6,531,682 B1
(45) Date of Patent: Mar. 11, 2003

(54) PROCESSING HEAD FOR A LASER ENGRAVING OR CUTTING DEVICE

(75) Inventor: Ernst Güttler, Wels (AT)

(73) Assignee: Trodat GmbH., Wels (AU)

( * ) Notice: Subject to any disclaimer, the term of this patent is extended or adjusted under 35 U.S.C. 154(b) by 0 days.

(21) Appl. No.: 09/402,139

(22) PCT Filed: Aug. 1, 1999

(86) PCT No.: PCT/AT99/00004
§ 371 (c)(1),
(2), (4) Date: Sep. 29, 1999

(87) PCT Pub. No.: WO99/38643
PCT Pub. Date: Aug. 5, 1999

(30) Foreign Application Priority Data

Jan. 29, 1998 (AT) .................................................. 146/98

(51) Int. Cl.⁷ .............................................. B23K 26/14
(52) U.S. Cl. .................................................. 219/121.84
(58) Field of Search ...................... 219/121.67, 121.72, 219/121.84

(56) References Cited

U.S. PATENT DOCUMENTS

| 4,315,133 A | 2/1982 | Morgan et al. | ............. 219/121 |
| 4,782,205 A | 11/1988 | Shira | ............. 219/74 |
| 4,942,284 A | * 7/1990 | Etcheparre et al. | .... 219/121.84 |
| 5,662,762 A | 9/1997 | Ranalli | ............. 156/344 |
| 6,144,010 A | * 11/2000 | Tsunemi et al. | ....... 219/121.84 |

FOREIGN PATENT DOCUMENTS

| DE | 3923829 A1 | 1/1991 | |
| EP | 0330565 | 8/1989 | |
| JP | 59-87996 | * 5/1984 | |
| JP | 63-241399 | * 10/1988 | ............ 219/121.84 |
| JP | 64-62295 | * 3/1989 | ............ 219/121.84 |
| JP | 1158050 A | 3/1999 | |

* cited by examiner

Primary Examiner—Geoffrey S. Evans
(74) Attorney, Agent, or Firm—Karl Hormann

(57) ABSTRACT

Processing head (1) for a laser engraving or cutting apparatus, especially for processing stamp plates, which is provided with an enclosed housing in which the processing head is moveable in a controlled manner relative to a base supporting the workpiece, the processing head being provided with a hood (6) connected to a dust suction device and terminating at a distance from the surface of the workpiece, the processing head being provided with at least two gas blow nozzles (7,8) one of the gas blow nozzles (7) being directed at an angle toward the vertically impinging laser beam (L), the other gas blow nozzle (8) which is also inclined at an angle relative to the laser beam (L) is directed toward a point (P') of the surface of the workpiece spaced from the impinging site (P) of the laser beam.

3 Claims, 1 Drawing Sheet

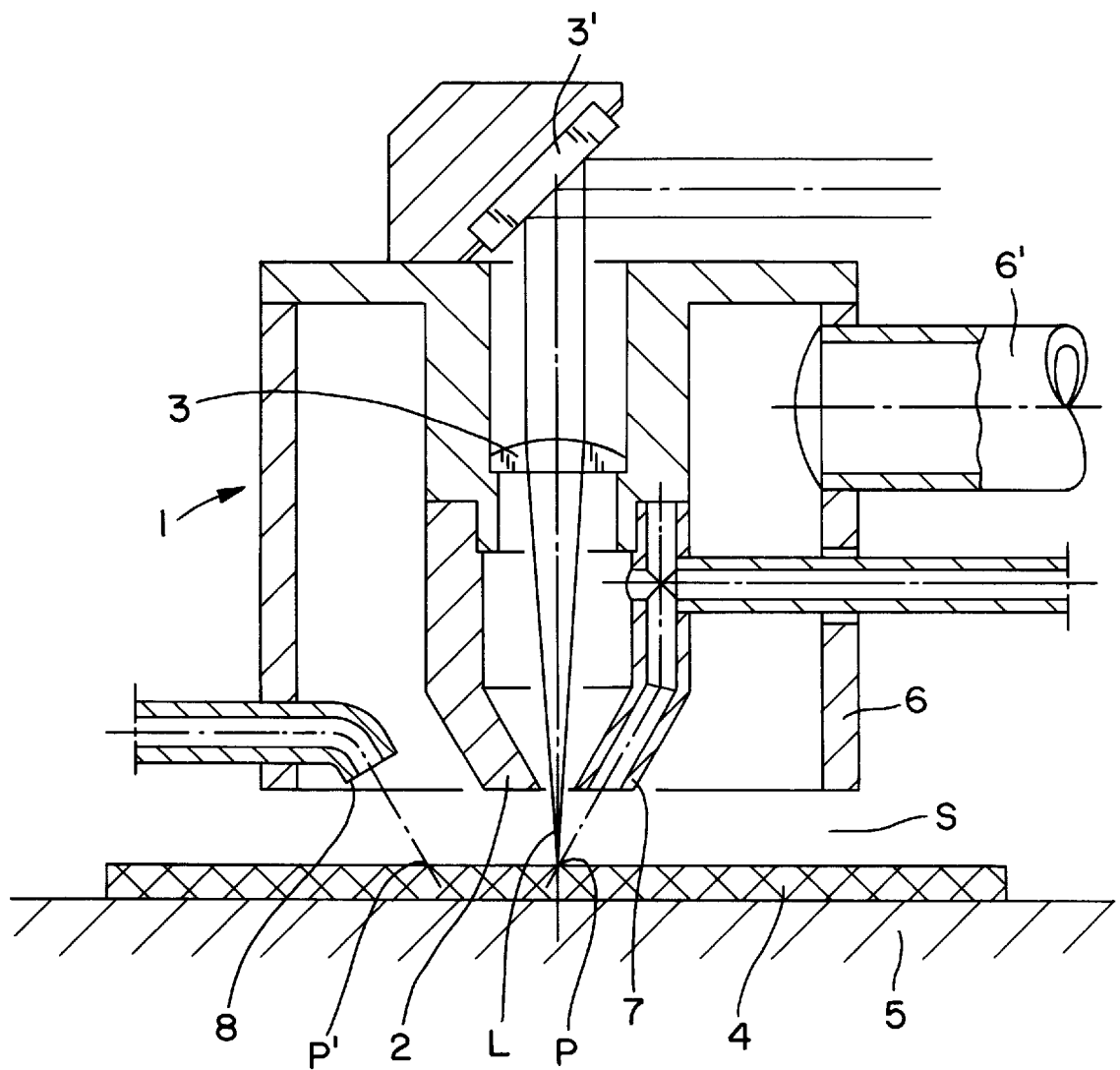

PROCESSING HEAD FOR A LASER ENGRAVING OR CUTTING DEVICE

BACKGROUND OF THE INVENTION

1. Field of the Invention

The invention relates to a processing head for a laser engraving or cutting apparatus and, more particularly, to an apparatus for processing stamp plates, provided with an enclosed housing in which the processing head and its lens support and gas blow nozzle are moveable in a controlled manner relative to a base for supporting a workpiece, the head being provided with a hood connected to a vacuum device for dust removal and terminating in spaced relationship from the surface of the workpiece.

Engraving rubber for text plates for use in stamps creates a lot of dust. Such dust, when swirling in the interor of a laser engraving apparatus, leads to soiling of lenses and mirrors and requires extensive cleaning operations. It also reduces the reliability as well as precision of the mechanical system.

2. The Prior Art

An apparatus of the kind referred to supra is already known from European Patent 0 330 565 B1. In it, nozzles are symmetrically and annularly arranged around a laser exit channel such that they blow gas inwardly in the direction of the focal point of the laser beam, for blowing away any dust. While this leads to swirling up of dust particles and their removal by the suction hood the severance force of the impinging gas jets is relatively low.

Good results as to the removal of dust created by laser engraving are obtained by a gas jet impinging obliquely on the focal point. However, the dust cannot be reliably removed because for reasons of safety the suction hood has to be placed at a certain distance from the surface of the workpiece; and a considerable quantity of the swirled-up dust will nevertheless escape to the surrounding process chamber of the enclosed housing, through the relatively narrow gap. Thus, an important aspect of the intended purpose is not satisfied.

OBJECT OF THE INVENTION

It is an object of the invention to provide a processing head for a laser engraving apparatus which avoid this drawback and which substantially reduces the servicing requirements of the laser engraving apparatus.

BRIEF SUMMARY OF THE INVENTION

In accordance with the invention, the object is accomplished by providing the processing head with at least two gas blow nozzles one of which is angularly disposed relative to the target of the vertically impinging laser beam while the other nozzle which is also angularly inclined relative to the laser beam, is directed toward a point of the workpiece surface laterally displaced from the point of impingement or target of the laser beam.

In this manner, it is possible by appropriately injected gas, such as air, an inert gas or another gas, to swirl up loose dust directly during an engraving operation and to remove it by the suction hood associated with the processing head or lens support so that it can in no circumstances escape to the surrounding processing chamber.

The basic concept of the invention is that while air blown in at an angle relative to the axis of the laser beam may be presented relatively easily, the velocity of the injected air is relatively low at the very point of impingement so that dust is removed in a very deficient manner. By contrast, in the embodiment in accordance with the invention, dust just created is swirled up and propelled away by an oblique gas jet aimed substantially in the direction of the focal point, and is retarded by the second jet aiming at a point intermediate the focal point and the outer margin of the suction hood. The retarding action of the second air jet prevents escape of the swirled-up dust from between the workpiece and the suction hood. Rather, it is suctioned off in a satisfactory and complete manner.

BRIEF DESCRIPTION OF THE SINGLE DRAWING

The invention will hereinafter be described in detail on the basis of an embodiment and with reference to a drawing in which the lower portion of a laser processing head is schematically depicted in vertical section.

DETAILED DESCRIPTION OF THE PREFERRED EMBODIMENT

The laser processing head I which is moveable in a controlled manner in an enclosed housing (not shown) is provided with a support 2 for a lens 3 by which a laser processing beam generated by a device (also not shown) and entering by way of a mirror 3' is directed vertically upon the surface of a workpiece 4. The workpiece 4 is placed upon a workpiece support 5 of the housing. The laser processing head 1 and the workpiece support 5 may move relative to each other by a controlled movement.

The lens support 2 is enveloped by a suction hood 6 for the removal of dust. The hood 6 terminates at a predetermined distance from the surface of the workpiece 4 and is connected to an appropriate dust suction or vacuum device 6' for removing any dust created during a processing operation.

Within the hood 6 there are arranged two gas nozzles 7, 8, preferably inclined at an angle between 40 and 80° relative to the vertical laser beam L. One of the nozzles 7 is directing a gas jet to the point of impact of the laser beam L; the other nozzle 8 is directing its gas jet to a point P' on the surface of the workpiece, located between the point of impact P of the laser beam L and the peripheral margin of the suction hood 6.

The nozzles 7, 8 are fed from a gas storage (not shown) with pressurized gas, such as air, or an inert gas. The radial dispersal velocity of the dust created at point P is retarded by the gas jet impinging at P' at a distance from point P, so that the dust cannot permeate, or escape through, gap S between the hood 6 and the surface of the workpiece 4.

It will be understood that the invention is not limited to the embodiment described, but that it may be altered within the scope of the inventive concept.

What is claimed is:

1. An apparatus for cutting or engraving workpieces with a laser, comprising:
   a base for supporting a workpiece;
   a head mounted for movement relative to the base;
   a lens mounted in the head for directing a laser beam on a workpiece in a direction substantially normal thereto to impinge upon a first point thereof;
   a hood covering the head and terminating at a margin spaced from the base, the interior of the hood being connected to a source of vacuum pressure for removing dust created by cutting or engraving;

a first nozzle connected to a source of pressurized gas for directing a jet of gas toward the workpiece in an orientation inclined relative to the laser beam and impinging substantially at the first point of the workpiece to swirl up the dust; and a second nozzle connected to a source of pressurized gas for directing a jet of gas toward the workpiece in an orientation inclined relative to the laser beam and impinging at a second point on the workpiece laterally offset from the first point to retard movement of dust particles thereby to prevent the dust particles from escaping between the margin of the hood and the base.

2. The apparatus of claim 1, wherein the first and second nozzles are inclined relative to the laser beam at an angle between 40 and 80°.

3. The apparatus of claim 1, wherein the first nozzle is mounted on means for mounting the lens.

\* \* \* \* \*

UNITED STATES PATENT AND TRADEMARK OFFICE
CERTIFICATE OF CORRECTION

PATENT NO.    : 6,531,682 B1
DATED         : March 11, 2003
INVENTOR(S)   : Guettler, Ernst It is certified that error appears in the above-identified patent and that said Letters Patent is hereby corrected as shown below:

<u>Title page,</u>
Item [22], should read -- PCT Filed: 8 January 1999 --

Signed and Sealed this

Sixteenth Day of September, 2003

JAMES E. ROGAN
*Director of the United States Patent and Trademark Office*